United States Patent
Harmon et al.

[11] Patent Number: 5,102,194
[45] Date of Patent: Apr. 7, 1992

[54] SEAT FRAME

[76] Inventors: Michael L. Harmon; John E. Tedstrom, both of 30244-2 County Rd. 12W, Elkhart, Ind. 46514

[21] Appl. No.: 707,201

[22] Filed: May 23, 1991

Related U.S. Application Data

[63] Continuation of Ser. No. 390,081, Aug. 7, 1989, abandoned.

[51] Int. Cl.⁵ .............................. A47C 1/026
[52] U.S. Cl. .................... 297/367; 257/153
[58] Field of Search ........... 297/367, 369, 151, 144, 297/157

[56] References Cited

U.S. PATENT DOCUMENTS

| | | | |
|---|---|---|---|
| 2,505,490 | 4/1950 | Greenbaum | 297/151 |
| 3,133,764 | 5/1964 | Naef | 297/367 |
| 3,901,100 | 8/1975 | Iida et al. | 297/367 X |
| 4,103,964 | 8/1978 | Klingelhöfer et al. | 297/367 |
| 4,938,603 | 7/1990 | Turner et al. | 297/153 |
| 4,946,223 | 8/1990 | Croft et al. | 297/367 |

Primary Examiner—Peter A. Aschenbrenner
Attorney, Agent, or Firm—James D. Hall

[57] ABSTRACT

A seat frame for reclining type seat which includes a toggle actuated release mechanism for the back support pivot joint. The release mechanism includes a toggle arm connected to peripheral lock members which mesh with rotatable gears connected to the back support. A manually operable lever arm is connected to the toggle arm knee joint to selectively shift the toggle arm between a normally locked position and an unlocked position wherein the back support may be shifted.

8 Claims, 4 Drawing Sheets

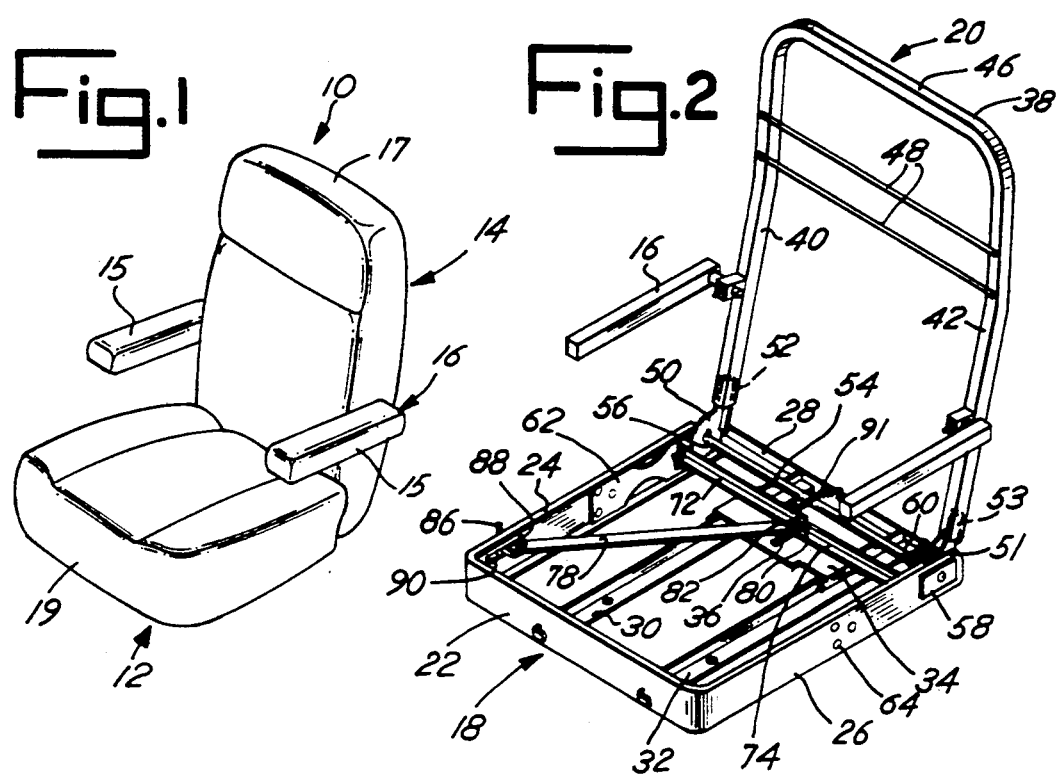
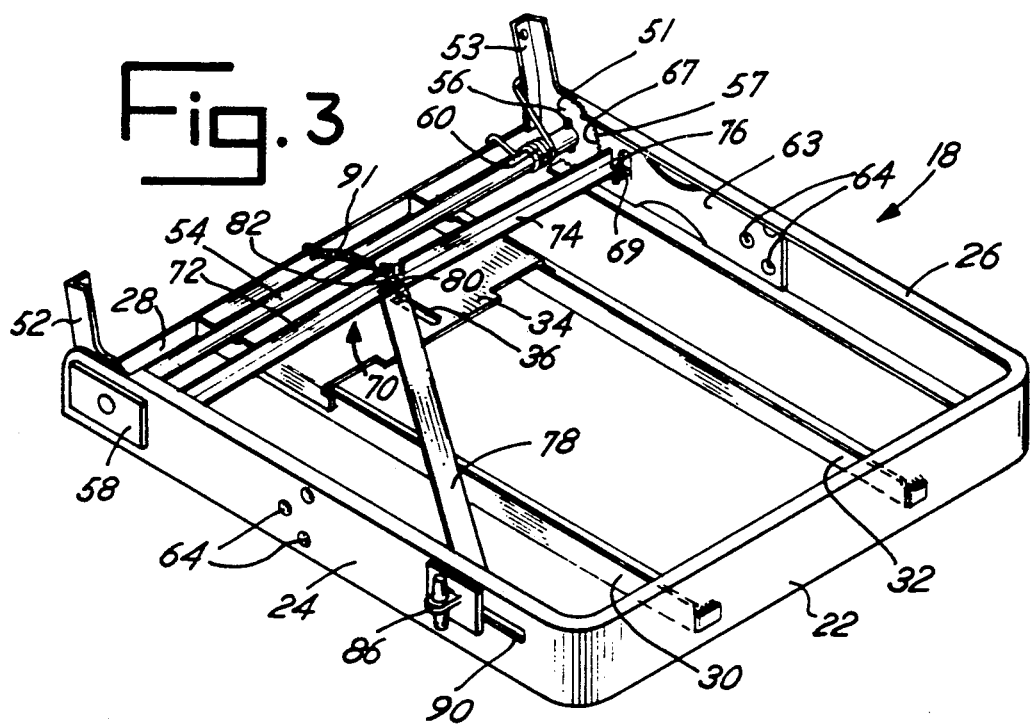

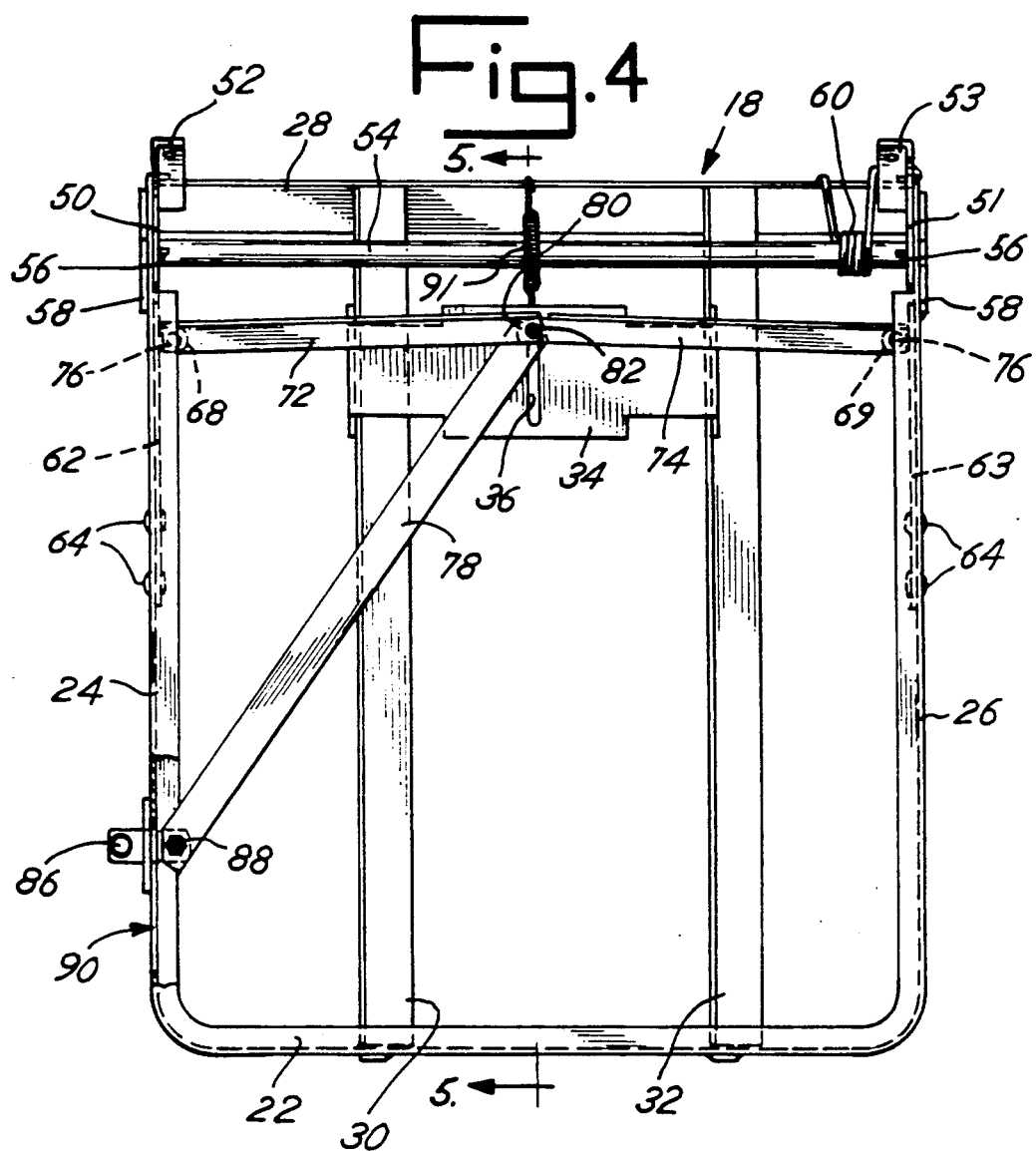
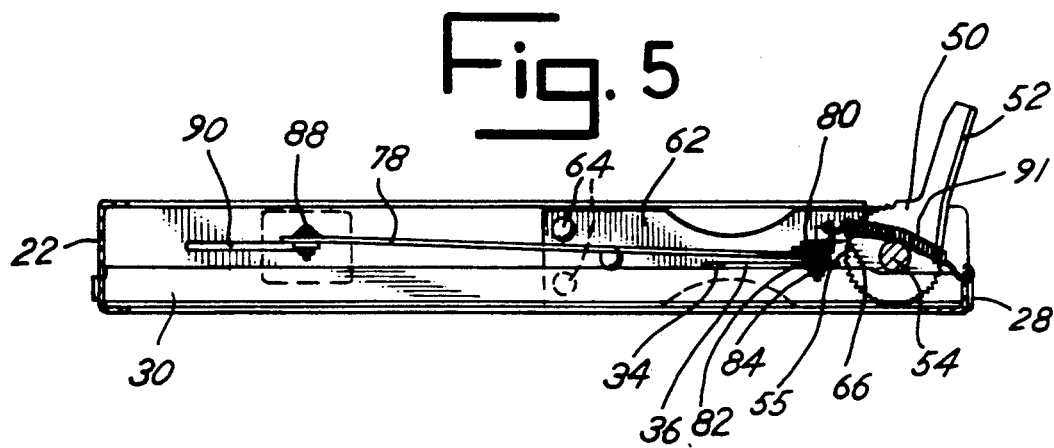

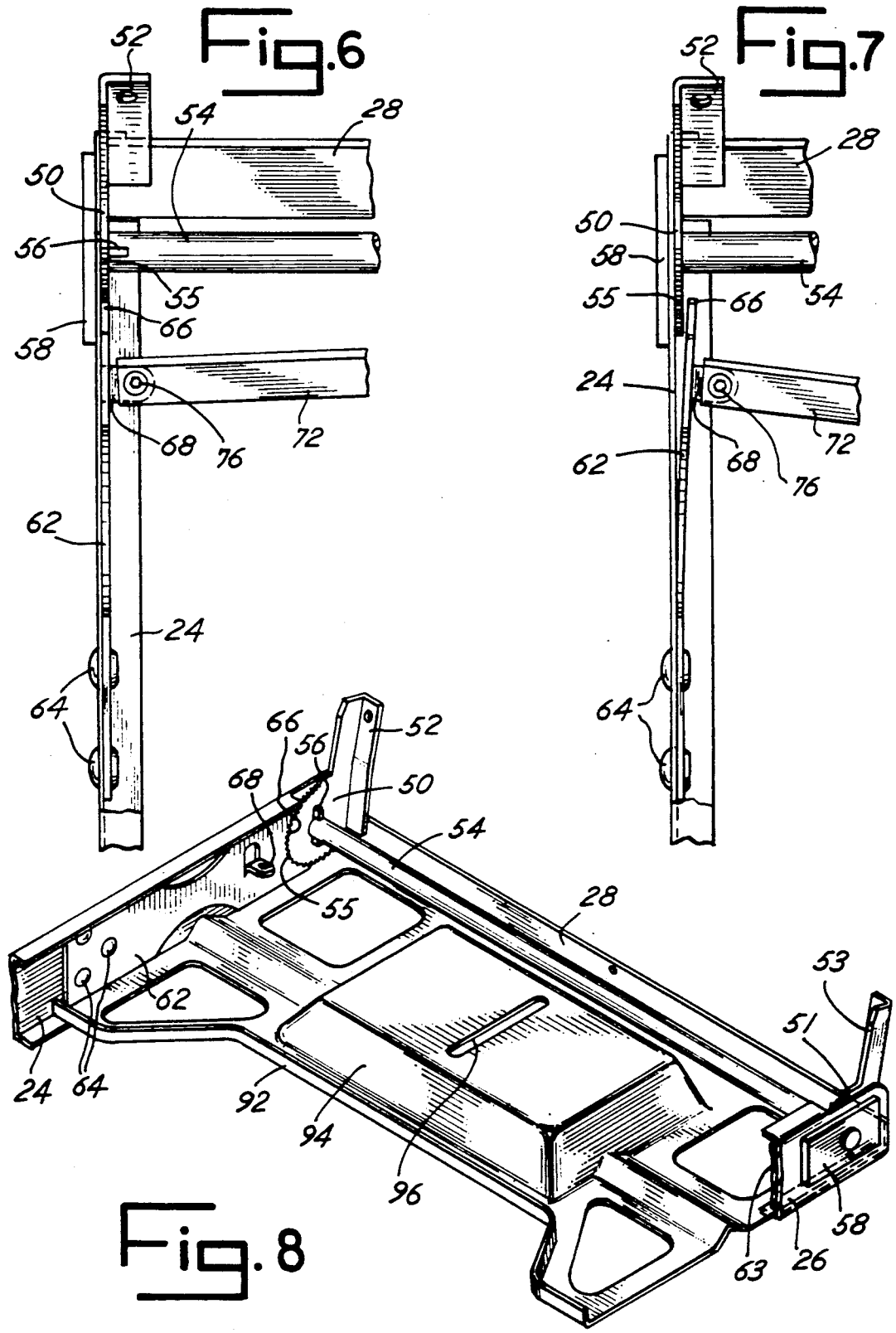

SEAT FRAME

This is a continuation of copending application Ser. No. 07/390,081 filed on Aug. 7, 1989, now abandoned.

SUMMARY OF THE INVENTION

This invention relates to seat frames, and will have special application to seat frames with a shiftable back support, commonly referred to as a recliner.

Recliner seats, particularly those found in the vast majority of motor vehicles, normally include a manually operated, side located catch which releases a lock to allow the seat back to be shift between upright and reclined positions.

The recliner seat of this invention includes a toggle arm connected to one or two side located lock plates whose teeth mesh with the gears connected to the reclinable back support. A lever arm is connected to the knee joint of the toggle arm and is accessible through a slide actuator. The toggle arm may include a biasing spring to urge the lock plates into a locked position when the slide actuator is released.

Accordingly, it is an object of this invention to provide for an improved locking system for recliner seats.

Another object is to provide for a recliner seat locking system which utilizes a toggle type actuator.

Another object is to provide for a recliner seat locking system which is durable, efficient and economical.

Still another object is to provide for a recliner seat locking system which is more easily accessible to the user.

Other objects will become apparent upon a reading of the following description.

BRIEF DESCRIPTION OF THE DRAWINGS

FIG. 1 is a perspective view of a reclining seat with the seat back in an upright position.

FIG. 2 is a perspective view of the seat frame and back frame with the back frame in an upright position.

FIG. 3 is a perspective view of the seat frame illustrating the locking system and actuator in a locked position.

FIG. 4 is a top plan view of the seat frame.

FIG. 5 is a sectional view taken along line 5—5 of FIG. 4.

FIG. 6 is a fragmented detail top plan view of the seat frame illustrating the right half of the toggle arm and lock plate in a locked position.

FIG. 7 is a fragmented detail top plan view similar to FIG. 6, but with the toggle arm and lock plate in an unlocked position.

FIG. 8 is a fragmented perspective view of an alternative seat support configuration.

DESCRIPTION OF THE PREFERRED EMBODIMENTS

The preferred embodiments herein described are not intended to be exhaustive or to limit the invention to the precise forms disclosed. They are chosen and described to explain the principles of the invention and its application and practical use so that other skilled in the art might utilize its teachings.

Figure 9:
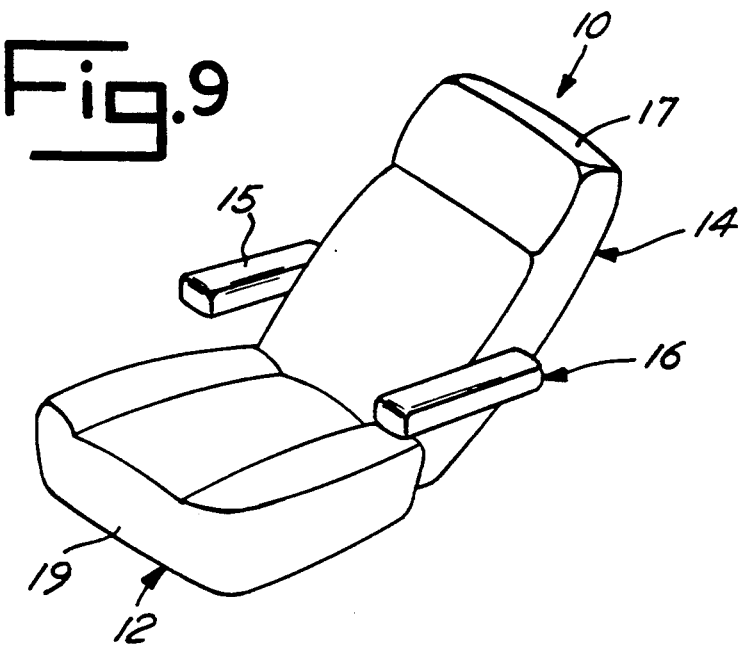
FIG. 9 is a perspective view of the seat with the seat back in a reclined position.

Referring first to FIGS. 1 and 9, reference numeral 10 refers generally to the recliner seat of this invention. Seat 10 includes a seat support 12, a back 14, and arm rests 16. Back support 14 is pivotally connected to seat support 12 so as to be shiftable between an upright seating position (FIG. 1) and a reclined position (FIG. 9). Arm rests 16 are optional and may be pivotally attached to the back support frame 20 as shown in FIG. 2.

Seat support 12 includes a seat frame 18 carried inside seat cushion 19 which is formed of covered foam. Back support 14 includes back frame 20 carried inside back cushion 17 also formed of covered foam. Arm rests 16 may also be carried inside foam cushions 15 to provide for maximum comfort of the user.

As shown in FIGS. 2-4, seat support frame 18 is generally rectangular and includes front frame member 22, side frame members 24, 26 and rear frame member 28. Although frame members 22, 24 and 26 are shown as a one-piece generally C-shaped channel part any acceptable construction is possible for use in this invention. In the construction shown, rear frame member 28 is connected between side frame members 24, 26 in a common manner. Mounting bars 30, 32 are connected between front frame member 22 and rear frame member 28 as shown. A plate 34 which defines slot 36 is connected across mounting bars 30, 32 as by welding or other conventional means.

Back support frame 20 includes a tubular frame member 38 defined by side frame members 40, 42 and upper frame member 46. As with seat support frame 18, frame members 40, 42 and 46 may be of one-piece construction or may be formed from multiple pieces connected in a common manner. Cross members 48 which are connected between frame members 40, 42 provide greater support and stability for back cushion 17.

Gear assemblies 50, 51 are positioned adjacent the rear portion of each seat support side frame member 24, 26. Each gear assembly 50, 51 includes an upright post part 52, 53 through which the gear assemblies are connected to tubular back support frame members 40, 42. A shaft 54 extends transversely through each gear assembly 50, 51 and is keyed thereto by conventional means such as pin 56 which allows for correlative rotation of the shaft and gear assemblies. Shaft 54 is journalled in supports 58 attached to seat side frame members 24, 26 as shown. A tension spring 60 is coiled about shaft 54 and has a first end connected to back support frame member 42 and a second end connected to seat support rear frame member 28 to control the speed at which back support 14 may recline and to bias the back support in a normally upright position.

The lock mechanism shown in the drawings includes one or more lock plates (two shown) 62, 63 connected at one end to frame members 24, 26 respectively as by fasteners 64. Each lock plate is preferably formed of bendable sheet metal and includes teeth 66, 67 which mesh with the teeth 55, 57 of gear assemblies 50, 51 when in the locked position of FIGS. 2-6. Each lock plate 62, 63 includes an integral tab outturned 68, 69 adjacent teeth 66, 67 and may include a central portion of narrowed dimensions to facilitate bending of the lock plate between the locked and unlocked positions.

A toggle arm 70 includes arm members 72, 74 which are connected to lock plates 62, 63 via fasteners 76 extending through the arm member and through lock plate tabs 68, 69. A lever arm 78 is connected to the connecting knee joint 80 of toggle arm members 72, 74 through pivot pin 82. Pivot pin 82 extends through plate slot 36 and is slidably held in the slot by a stop shown in the drawings (FIG. 5) as a conventional threaded nut 84 which is threaded onto pivot pin 82. Lever arm 78 is connected to slide actuator 86 by pivot pin 88 with the slide actuator extending outwardly of seat frame 18 through a slot 90 in frame member 24 to permit access by the seat user. A biasing member such as helical spring 91 is connected between toggle arm 70 and seat frame 18 to urge the toggle arm rearwardly to shift the lock plates 62, 63 into the locked position when actuator 86 is released.

FIG. 8 illustrates an alternative construction of plate 34 and depicts a subframe 92 which includes integral raised part 94 which has a guide slot 96. In this embodiment, back frame member 28 is formed integrally with subframe 92. All other parts of seat 10 function as shown in FIGS. 1-7, with the pivot pin 82 held in slot 96 in the same fashion as described above.

Figure 10:
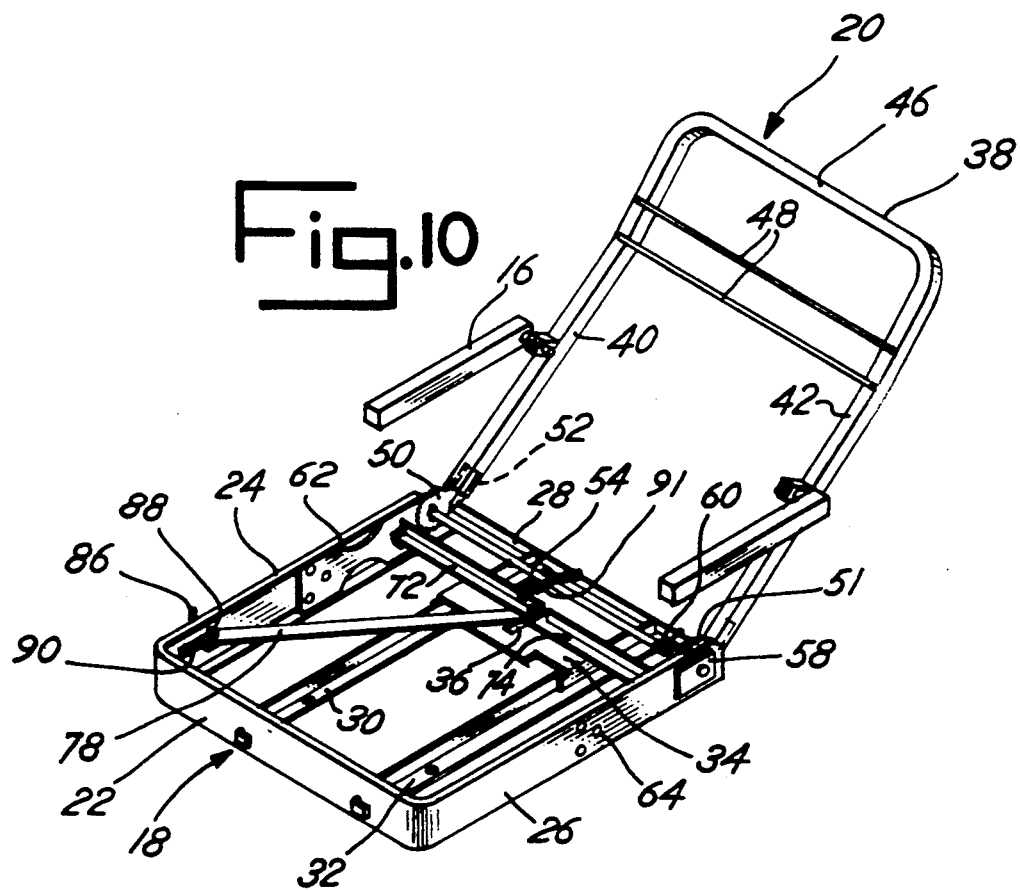
FIG. 10 is a perspective view of the seat frame with the lock in an unlocked position.

Seat back support 14 may be adjusted between the upright position of FIG. 1 and the reclined position of FIG. 9 as follows. With the back support 14 in the position of FIG. 1, a user slides actuator 86 forwardly in slot 90. Lever arm 78 slides forward to apply a pulling force on toggle arm knee joint 80. Toggle arms 72, 74 shift forwardly and apply a pulling force on lock plates 62, 63 through their connection to tabs 68, 69. The resiliency of lock plates 62, 63 causes the lock plates to bend towards each other as shown in FIGS. 7 and 10 to disengage teeth 66, 67 from gear teeth 55, 57. Back support 14 is now free to recline into the desired position. Due to the plurality of teeth in the gears and lock plates a multiplicity of positions may be selected for maximum flexibility and comfort of the user. When the desired position is selected, the user releases slide actuator 86. Spring 91 then urges the toggle arms 72, 74 rearward, and the lock plates return to their locked position automatically. Plate slot 36 (or slot 96 in FIG. 8) provides for straight line movement of lever arm 78 which insures that equal pulling force will be applied to lock plates 62, 63 for reliable locking and unlocking thereof.

It is to be understood that the invention is not limited to the detail above-given, but may be modified within the scope of the following claims.

What is claimed is:

1. In a seat frame including a seat support having spaced side frame parts and a back support having spaced side frame parts, pivot means pivotally connecting said back support to said seat support for accommodating shifting movement of the back support between an upright sitting position and a reclined position, lock means located adjacent said side frame parts for securing said back support in one of said upright and reclined positions, and actuator means for shifting said lock means between a locked position securing said back support in one of said upright and reclined positions and an unlocked position wherein shifting of the back support relative to the seat support is permitted, the improvement wherein said actuator means includes a toggle arm pivotally connected at one end to said lock means and slidably connected at another end to said seat support at a pivotal knee joint, a lever arm connected at one end to said knee joint and extending through one of said seat support side frame parts such that said lever arm being accessible to a user and constituting means for applying force to said knee joint and toggle arm to selectively laterally shift said lock means between its said locked and unlocked positions relative to said seat support side frame parts.

2. The seat frame of claim 1 wherein said lever is connected to said toggle arm knee joint by a pivot pin, said sent support including a said plate having a slot, said pivot pin fitted in said slot wherein the slot constitutes guide means for said pivot pin and lever arm to promote accurate linear movement thereof.

3. The seat frame of claim 1 wherein said pivot means includes a gear connect to each back support side frame part, at least one said gear including a plurality of teeth, a shaft rotatably connected to said seat support and fixed to each gear, said lock means including a bendable lock plate having teeth which mesh with the teeth of said one gear when the lock means is in the locked position.

4. The seat frame of claim 3 and a biasing means connected between said toggle arm and one of said seat support and back support for biasing said toggle arm to urge said lock means into said locked position.

5. In a seat frame including a seat support having spaced side frame parts and a back support having spaced side frame parts, pivot means pivotally connecting said back support and said seat support for accommodating shifting movement of the back support between an upright sitting position and a reclined position, said pivot means including a gear connected to each back support side frame member, each gear being adjacent one of said seat support side frame parts and including a plurality of teeth, said pivot means further including a shaft extending through said gears and said seat support side frame parts, said gears being rotatable about said shaft, locking means connected at a proximal end to one of said seat support side frame parts and including a plurality of teeth at a distal end for meshing with the gear adjacent said one of said seat support frame parts to lock said back support in a fixed position relative to said back support, said locking means being yieldable in a lateral direction relative to said one seat support side frame part to disengage said gear and permit said back support to pivot relative to said seat support, and lever means connected to said lock means for causing said lock means to yield into disengagement with said gear.

6. The seat frame of claim 5 wherein said lever means includes a first arm pivotally connected between locking means and a hinge pin, a second arm being pivotally connected at one end to said hinge pin and terminating at a second end adjacent the seat support side frame part opposite said locking means, said hinge pin being slidably accommodated within a slot in said seat support, said slot being generally parallel with said seat support side frame parts, a shiftable handle being pivotally connected to said second end of said second arm and slidably engaging the seat support side frame part opposite said locking means, wherein as said handle slides along said seat support said second arm shifts said hinge pin within said slot, wherein shift said hinge pin causes said first arm to shift said locking means laterally relative to said seat support side frame members.

7. In a seat frame including a seat support having spaced side frame parts and a back support having spaced side frame parts, pivot means pivotally connecting said back support and said seat support for accommodating shifting movement of the back support between an upright sitting position and a reclined position, said pivot means including a gear connected to a said back support side frame member, said gear being adjacent a said seat support side frame part, said gear being rotatable relative to said adjacent seat support side frame part, locking means connected at a proximal end to said adjacent seat support side frame part and including a plurality of teeth at a distal end for meshing with said gear to lock said back support in a fixed position relative to said back support, said locking means being yieldable in a lateral direction relative to said adjacent seat support side frame part to disengage said gear and permit said back support to pivot relative to said seat support, and lever means connected to said lock means for causing said lock means to yield into disengagement with said gear.

8. The seat frame of claim 7 wherein said gear includes a plurality of teeth, said locking means including a bendable lock plate having teeth which mesh with the teeth of said gear when the locking means locks said back support in its said fixed position.

* * * * *